(12) United States Patent
Hamilton et al.

(10) Patent No.: US 8,014,911 B2
(45) Date of Patent: Sep. 6, 2011

(54) METHODS AND SYSTEMS FOR IMPOSING A MOMENTUM BOUNDARY WHILE REORIENTING AN AGILE VEHICLE WITH CONTROL MOMENT GYROSCOPES

(75) Inventors: Brian Hamilton, Glendale, AZ (US); Brian Underhill, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 3 days.

(21) Appl. No.: 12/611,485

(22) Filed: Nov. 3, 2009

(65) Prior Publication Data

US 2011/0101167 A1    May 5, 2011

(51) Int. Cl.
B64G 1/28 (2006.01)
(52) U.S. Cl. .................................. 701/13; 244/165
(58) Field of Classification Search ............. 701/13; 244/165
See application file for complete search history.

(56) References Cited

U.S. PATENT DOCUMENTS

| | | | |
|---|---|---|---|
| 5,248,118 A | 9/1993 | Cohen et al. | |
| 5,441,222 A | 8/1995 | Rosen | |
| 5,452,869 A | 9/1995 | Basuthakur et al. | |
| 6,128,556 A * | 10/2000 | Bailey | 701/13 |
| 6,131,056 A | 10/2000 | Bailey et al. | |
| 6,138,953 A | 10/2000 | Noyola et al. | |
| 6,360,996 B1 | 3/2002 | Bockman et al. | |
| 6,382,565 B1 | 5/2002 | Fowell | |
| 6,499,699 B1 * | 12/2002 | Salenc et al. | 244/165 |
| 6,550,721 B2 * | 4/2003 | Williams et al. | 244/165 |
| 7,014,150 B2 * | 3/2006 | Peck et al. | 244/165 |
| 7,171,290 B2 * | 1/2007 | Lagadec et al. | 701/13 |
| 7,370,833 B2 | 5/2008 | Johnson et al. | |
| 2006/0027708 A1 | 2/2006 | Peck et al. | |
| 2006/0231675 A1 * | 10/2006 | Bostan | 244/12.1 |
| 2007/0102585 A1 * | 5/2007 | Johnson et al. | 244/165 |
| 2007/0124032 A1 * | 5/2007 | Elgersma et al. | 701/13 |
| 2007/0252044 A1 | 11/2007 | Jackson et al. | |
| 2008/0105787 A1 * | 5/2008 | Hamilton et al. | 244/165 |
| 2008/0203230 A1 | 8/2008 | Ogo et al. | |
| 2008/0251646 A1 | 10/2008 | Heiberg | |
| 2009/0039202 A1 | 2/2009 | Ogo et al. | |

FOREIGN PATENT DOCUMENTS

EP    1793297 A2    6/2007

OTHER PUBLICATIONS

Paradiso, J.A.; Global Steering of Single Gimballed Control Moment Gyroscopes Using a Directed Search; Journal of Guidance and Control and Dynamics, vol. 15, No. 5, Sep. 1, 1992, XP-002112654.
Hamilton, B. et al.; Modern Momentum Systems for Spacecraft Attitude Control; Advances in the Astronautical Sciences; vol. 125, Jan. 1, 2006, XP009142982.
EP Search Report, EP 10180491.2-2422 dated Jan. 19, 2011.

* cited by examiner

Primary Examiner — Mark Hellner
Assistant Examiner — Ari M Diacou
(74) Attorney, Agent, or Firm — Ingrassia Fisher & Lorenz, P.C.

(57) ABSTRACT

Methods and systems are provided for reorienting an agile vehicle, such as a satellite or spacecraft, using a control moment gyroscope (CMG) array. The CMG array comprises a plurality of CMGs onboard the agile vehicle. A method comprises obtaining an input torque command for reorienting the vehicle using the CMG array and, when the angular momentum of the CMG array violates or is approaching a momentum boundary criterion, decreasing the input torque command in the kinetic momentum direction, resulting in a modified torque command, and operating the CMG array using the modified torque command.

21 Claims, 4 Drawing Sheets

METHODS AND SYSTEMS FOR IMPOSING A MOMENTUM BOUNDARY WHILE REORIENTING AN AGILE VEHICLE WITH CONTROL MOMENT GYROSCOPES

TECHNICAL FIELD

The subject matter described herein relates generally to spacecraft attitude control systems, and more particularly, embodiments of the subject matter relate to methods and systems for reorienting an agile vehicle using a gyroscope array at a momentum boundary for the gyroscope array.

BACKGROUND

Gyroscopes are currently used in a number of military and civilian applications. One common application involves using gyroscopes, known as control moment gyroscopes (CMGs), to control the attitude (or orientation) of a spacecraft, satellite, or another agile vehicle. A CMG comprises a spinning rotor and one or more motorized gimbals, which are used to rotate the rotor (e.g., gimballing), which in turn alters the direction of the angular momentum vector of the rotor. This change in angular momentum produces a reactionary torque which causes the spacecraft to rotate to the desired attitude or orientation. Attitude control systems (ACSs) and other spacecraft orienting applications often utilize a momentum control system (MCS) that includes at least three single-gimbal CMGs, also known as a CMG array.

Hardware limitations of the CMGs limit the amount of momentum that may be transferred and/or stored by the individual CMGs. Also, particular arrangements of the CMGs in the CMG array, known as singularities, limit the ability of the CMG array to produce torque in certain directions, thereby limiting the ability of the ACS to reorient the vehicle in some directions. Therefore, one or more control schemes, also known as steering control laws, are utilized by the MCS to determine how the individual CMGs should be rotated to produce a desired overall torque (or a commanded torque) without causing singularities or saturation in the CMG array. Often, the steering control law(s) impose a limit on the amount of momentum that may be stored and/or transferred by the CMG array. The momentum limit is a non-linear and complex function of the direction of the spacecraft's angular momentum, the angular position of the gimbals (or gimbal angles) for the individual CMGs of the CMG array, and the steering control law(s) being utilized with the CMG array. In this regard, in three-dimensional space, the momentum limits imposed by the steering control law(s) may be represented as an irregular polyhedron comprising the set of allowable momentum vectors in the various momentum directions.

Because the momentum limit imposed by the steering control law(s) is complex and non-linear, most prior art attitude control systems utilize a self-imposed momentum limit that is confined by the momentum limits imposed by the steering control law(s). In this regard, in three-dimensional space, the self-imposed momentum limits may be represented as a sphere inscribed within the irregular polyhedron corresponding to the momentum limits imposed by the steering control law(s). In some applications, it is desirable to be able to reorient a vehicle as quickly as possible. However, the prior art systems conservatively limit the momentum of the CMG array and fail to maximize the momentum capabilities achievable under the steering control law(s). Thus, although the CMG array is capable of providing additional momentum (corresponding to the volume between the outer surfaces of the irregular polyhedron and the sphere inscribed within the polyhedron in three-dimensional space) that would allow the vehicle to be reoriented more quickly, the available momentum of the CMG array is not fully utilized by the prior art.

BRIEF SUMMARY

A method is provided for reorienting a vehicle using a control moment gyroscope (CMG) array. The CMG array comprises a plurality of CMGs onboard the vehicle and the CMG array has a total angular momentum including a kinetic angular momentum component in a kinetic momentum direction. The method comprises obtaining an input torque command for reorienting the vehicle using the CMG array and, when the total angular momentum violates or is approaching a momentum boundary criterion, decreasing the input torque command in the kinetic momentum direction, resulting in a modified torque command, and operating the CMG array using the modified torque command.

In another embodiment, a control system for an agile vehicle is provided. The control system comprises an attitude control system (ACS) configured to provide a torque command for reorienting the agile vehicle and a momentum control system (MCS) coupled to the ACS. The MCS comprises a control moment gyroscope (CMG) array comprising a plurality of CMGs onboard the agile vehicle. The MCS is configured to obtain the torque command from the ACS and identify when angular momentum of the CMG array violates or is approaching a momentum boundary criterion. When the angular momentum of the CMG array violates or is approaching the momentum boundary criterion, the MCS is configured to determine a modified torque command by decreasing the torque command in a direction of kinetic angular momentum of the CMG array and operating the CMG array using the modified torque command.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
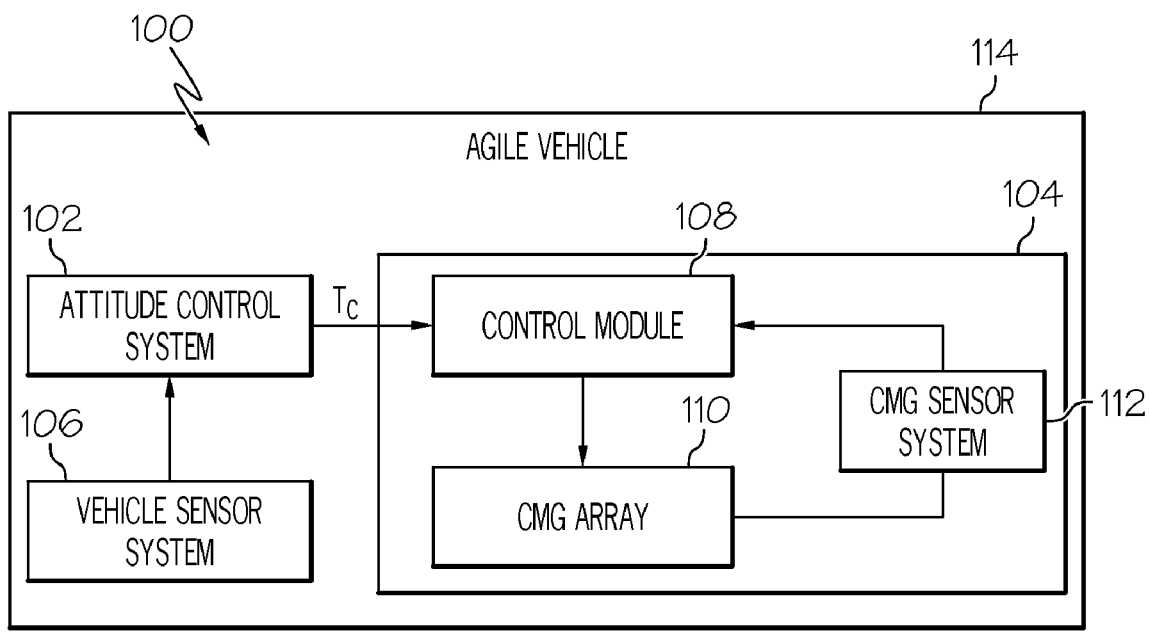
FIG. 1 is a block diagram of a control system suitable for use with an agile vehicle in accordance with one embodiment.

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms referring to structures do not imply a sequence or order unless clearly indicated by the context.

For the sake of brevity, conventional techniques related to attitude control systems, gyroscope controls, slew planning, satellite and/or spacecraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate generally to methods and systems for optimizing the torque and momentum produced by an array of control moment gyroscopes (CMGs) (alternatively referred to herein as a CMG array). Although the subject matter may be described herein in the context of an agile vehicle, such as a satellite, various aspects of the subject matter may be implemented in other spacecraft or in other applications that utilize CMGs, and the subject matter is not intended to be limited to use with any particular vehicle. As described below, in an exemplary embodiment, an attitude control system (ACS) provides a torque command corresponding to a desired torque to reorient or otherwise adjust the attitude of an agile vehicle. The CMG array is operated in accordance with one or more steering control laws to provide the desired torque which changes the angular momentum of the agile vehicle and adjusts the attitude of the agile vehicle. When the angular momentum of the CMG array violates (or is approaching) a momentum boundary (or limit) in the current momentum direction, the torque command provided by the ACS is decreased in the direction of the kinetic angular momentum of the CMG array. As a result, the momentum of the CMG array is maintained within the momentum boundary prescribed by the steering control laws while maintaining the ability to obtain useful torque from the CMG array in cross-axis directions (e.g., directions orthogonal to the kinetic angular momentum).

As used herein, the angular momentum of the CMG array violates the momentum boundary (or alternatively, the momentum boundary is violated), when the magnitude of the total angular momentum of the CMG array exceeds the magnitude of the momentum boundary in the direction of the total angular momentum of the CMG array (alternatively referred to herein as simply the "momentum direction"), or in other words, when the magnitude of the total angular momentum vector is greater than the magnitude of a vector from the reference point for the angular momentum of the CMG array to the momentum boundary in the momentum direction. Similarly, as used herein, the total angular momentum of the CMG array approaches (or is approaching) the momentum boundary when the relationship between the rate at which the total angular momentum is increasing and the difference between the total angular momentum and the momentum boundary is such that the total angular momentum of the CMG array is likely to violate (or exceed) the momentum boundary within an amount of time that is less than the amount of time required to stop rotation of the gimbals of the CMG array.

FIG. 1 depicts an exemplary embodiment of a control system 100 suitable for use with an agile vehicle 114, such as a satellite or other spacecraft. In an exemplary embodiment, the control system 100 includes, without limitation, an attitude control system (ACS) 102, a momentum control system (MCS) 104, and a vehicle sensor system 106. In an exemplary embodiment, the ACS 102 provides torque commands to a control module 108 of the MCS 104 for adjusting the attitude or otherwise reorienting the agile vehicle 114 using a control moment gyroscope (CMG) array 110. It should be understood that FIG. 1 is a simplified representation of an agile vehicle 114 for purposes of explanation and ease of description, and FIG. 1 is not intended to limit the application or scope of the subject matter in any way. In this regard, although FIG. 1 depicts the ACS 102 onboard the agile vehicle 114, in some embodiments, the ACS 102 may be separate from the agile vehicle 114 and remotely located (e.g., at a terrestrial location on the Earth) and communicatively coupled to the MCS 104 and vehicle sensor system 106, for example, via a wireless data link or another suitable wireless data communication medium. In practice, the agile vehicle 114 may also include numerous other components for providing additional functions and features, as will be appreciated in the art.

In an exemplary embodiment, the vehicle sensor system 106 comprises one or more sensing elements (or sensors) configured to sense, measure, or otherwise obtain information regarding the current attitude (or orientation) and rotational velocity (or angular velocity or rotational rate) of the agile vehicle 114. In certain deployments, the sensor system 106 uses sensors or sensing elements such as, without limitation: rate gyroscopes, ring laser gyros, fiber optic gyros, star trackers and sun sensors. The ACS 102 is communicatively coupled to the vehicle sensor system 106, and the ACS 102 determines a torque command ($T_C$) for slewing, reorienting, or otherwise adjusting the attitude of the agile vehicle 114 based at least in part on the attitude and rotational velocity information received from the vehicle sensor system 106. The ACS 102 may determine the torque command ($T_C$) automatically based on the current attitude and/or rotational velocity of the agile vehicle 114 or in response to an input from a user. The MCS 104 is communicatively coupled to the ACS 102, and in response to a torque command ($T_C$) received from the ACS 102, the MCS 104 operates the CMGs of the CMG array 110 to adjust the attitude of the agile vehicle 114 based on the torque command ($T_C$) and one or more steering control laws utilized to operate the CMG array 110, as described in greater detail below. In this regard, the MCS 104 includes a CMG sensor system 112 coupled to the CMG array 110 and the control module 108, and the CMG sensor system 112 is configured to provide information about the operation of individual CMGs within the CMG array 110 to the control module 108, as described in greater detail below. In an exemplary embodiment, the CMG sensor system 112 includes one or more sensors configured to provide information concerning the state of the respective CMGs of the CMG array 110, such as, for example, the angular position and rate of the gimbal and the spin speed of the rotor, in order to support operation of the steering control laws being utilized by the MCS 104 and/or control module 108, as will be appreciated in the art.

In an exemplary embodiment, the CMG array 110 includes a plurality of CMGs, wherein each CMG of the CMG array 110 comprises a rotating element or rotor mounted to a gimbal assembly, which in turn is mounted to the agile vehicle 114. The rotor (e.g., a wheel or disc) is configured to rotate about a spin axis, which in turn can be tilted or rotated by rotating a gimbal about a gimbal axis. The motion or rotation of the gimbal produces a gyroscopic torque which is orthogonal to the spin axis and the gimbal axis. The gyroscopic torque is imparted or transferred to the agile vehicle 114 and causes a change in the angular velocity of the agile vehicle 114, based on the conservation of angular momentum principles, as will be appreciated in the art. In this regard, the kinetic angular momentum of the CMG array 110 and the angular momentum of the agile vehicle 114 are substantially equal but in opposing directions. Depending on the embodiment, the CMG array 110 may comprise any suitable CMG array geometry known in the art, such as a pyramid array, a roof array (e.g., a plurality of collinear sets of CMGs), a box array, or another suitable CMG array geometry.

The control module 108 generally represents the hardware, software, firmware, processing logic, and/or other components of the MCS 104 configured to support operation of the CMG array 110 in response to a torque command. The control module 108 may be implemented or realized with a general purpose processor, a content addressable memory, an application specific integrated circuit, a field programmable gate array, any suitable programmable logic device, discrete gate or transistor logic, discrete hardware components, or any combination thereof, designed to perform the functions described herein. In this regard, the control module 108 may be realized as a microprocessor, a controller, a microcontroller, a state machine, or the like. The control module 108 may also be implemented as a combination of computing devices, e.g., a plurality of processing cores, or any other such configuration. In practice, control module 108 includes processing logic that may be configured to carry out the functions, techniques, and processing tasks associated with the operation of the agile vehicle 114, as described in greater detail below. Furthermore, the steps of a method or algorithm described in connection with the embodiments disclosed herein may be embodied directly in hardware, in firmware, in a software module executed by control module 108, or in any practical combination thereof. In an exemplary embodiment, the control module 108 may also include a suitable amount of memory to support the operations of the control module 108 described herein.

Based on the torque command ($T_C$), the control module 108 calculates or otherwise determines the appropriate gimbal rate (e.g., the rate of rotation a gimbal about the gimbal axis) for each respective CMG of the CMG array 110 to provide the commanded torque. The control module 108 preferably determines the gimbal rate commands for the CMGs using one or more steering control laws intended to prevent conditions that lead to singularity and/or saturation of the CMG array 110. As used herein, a steering control law should be understood as referring to a control scheme and/or algorithm for determining gimbal rate commands for the CMGs of the CMG array 110 to produce a commanded torque while preventing conditions within the CMG array 110 that may lead to singularity and/or saturation. Various steering control laws are well known and will vary depending on the particular embodiment, and therefore, the specific methods for determining gimbal rate commands for the individual CMGs of the CMG array 110 will not be described in detail herein. The steering control law implemented by the control module 108 may provide a complex and non-linear three-dimensional momentum boundary which limits the total angular momentum of the CMG array 110 based on the direction of the total angular momentum (alternatively referred to herein as the momentum direction) to prevent singularities and/or saturation of the CMG array 110. In this regard, the set of the vectors comprising the angular momentum limits in the respective momentum directions results in a non-linear (or irregular) polyhedron in three-dimensional space, wherein the outer surfaces of the polyhedron represent the momentum boundary in three-dimensional space, as will be appreciated in the art.

Figure 2:
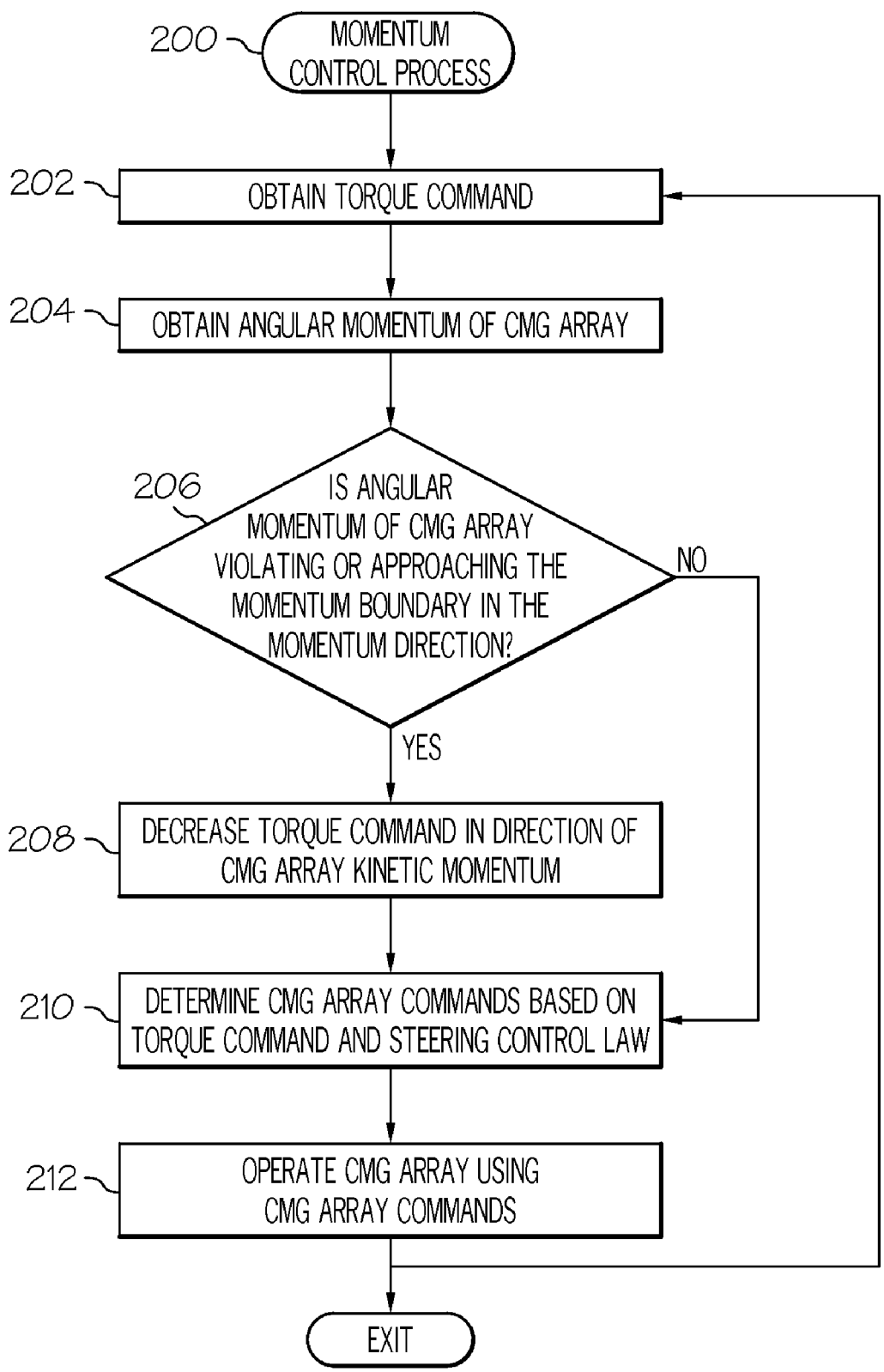
FIG. 2 is a flow diagram of a momentum control process suitable for use with the control system of FIG. 1.

Referring now to FIG. 2, in an exemplary embodiment, a control system may be configured to perform a momentum control process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system 100. It should be appreciated that any number of additional or alternative tasks may be included, and may be incorporated into a more comprehensive procedure or process having additional functionality not described in detail herein.

Referring again to FIG. 2, and with continued reference to FIG. 1, in an exemplary embodiment, the momentum control process 200 initializes by obtaining an input torque command for the vehicle (task 202). In an exemplary embodiment, the control module 108 obtains or otherwise receives an input torque command vector ($T_C$) from the ACS 102 that corresponds to a desired amount of reactionary torque to be provided by the MCS 104 and/or CMG array 110 to reorient or otherwise adjust the attitude of the agile vehicle 114 in a commanded direction to achieve a desired orientation and/or rotational velocity of the agile vehicle 114.

In an exemplary embodiment, the momentum control process 200 continues by obtaining or otherwise determining the total angular momentum of the CMG array (task 204). In this regard, the total angular momentum vector for the CMG array 110 (alternately referred to herein as simply the "total momentum") comprises a kinetic angular momentum component and a stored angular momentum component. As used herein, the kinetic angular momentum (alternatively referred to herein as simply the "kinetic momentum") of the CMG array 110 should be understood as referring to the component of the total angular momentum of the CMG array 110 that is equal and opposite to the angular momentum of the spacecraft, whereas the stored angular momentum (alternatively referred to herein as simply the "stored momentum") of the CMG array 110 should be understood as referring to the component of the total angular momentum of the CMG array 110 that has accumulated over time due to external sources, such as gravity gradients, aerodynamic drag, solar winds, and the like. In this regard, as shown in FIG. 3, the total momentum vector ($H_T$) corresponds to the vector sum of the kinetic momentum vector ($H_K$) (i.e., the kinetic momentum in the kinetic momentum direction) and the stored momentum vector ($H_S$) (i.e., the stored momentum in the stored momentum direction).

In an exemplary embodiment, the MCS 104 and/or control module 108 calculates or otherwise determines the total momentum of the CMG array 110 based upon information provided by the CMG sensor system 112. In an exemplary embodiment, the ACS 102 provides the MCS 104 and/or control module 108 with the stored momentum of the CMG array 110, which the control module 108 may subtract from the total momentum to calculate the magnitude and direction of the kinetic angular momentum of the CMG array 110. In alternative embodiments, the ACS 102 may determine the kinetic momentum of the CMG array 110 directly using vehicle rate sensors 106 and provide the kinetic momentum to the MCS 104. Various methods for calculating or otherwise determining the kinetic angular momentum are known in the art and will not be described in detail herein. Accordingly, the subject matter is not intended to be limited to any particular method or technique for determining the kinetic angular momentum of the CMG array 110.

Figure 3:
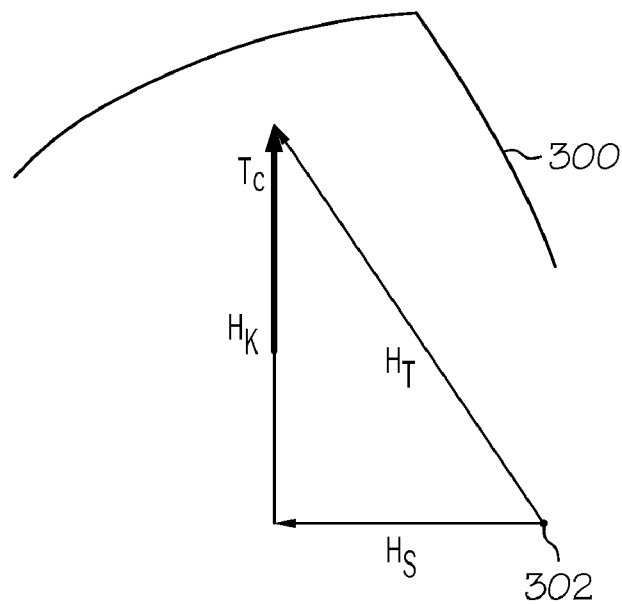
FIGS. 3-6 illustrate various states of the angular momentum of a control moment gyroscope array with respect to a momentum boundary suitable for use with the flow diagram of FIG. 2 in an exemplary embodiment.

Still referring to FIG. 2, and with continued reference to FIG. 1 and FIG. 3, in an exemplary embodiment, the momentum control process 200 continues by identifying or otherwise determining whether the total angular momentum of the CMG array violates or is approaching a momentum boundary criteria in the direction of the total angular momentum (alternatively referred to herein as the momentum direction) (task 206). As set forth above, the total angular momentum of the CMG array violates the momentum boundary criteria when the total angular momentum exceeds the momentum boundary criteria in the momentum direction and is approaching the momentum boundary criteria when the total angular momentum is sufficiently likely to violate the momentum boundary criteria before rotation of the gimbals of the CMG array can be stopped (i.e., a gimbal rate of zero). In an exemplary embodiment, the momentum boundary criteria comprises the momentum boundary in the momentum direction, that is, the limit on the total angular momentum of the CMG array in the momentum direction which is imposed by the steering law being used to control the CMG array. In this regard, in three-dimensional space, the momentum boundary corresponds to the outer surface of the irregular polyhedron consisting of the set of the vectors comprising angular momentum limits imposed by the steering control law(s) in respective momentum directions, as will be appreciated in the art. For example, FIG. 3 depicts a two-dimensional surface 300 representing a partial momentum boundary corresponding to limits on the total angular momentum of the CMG array imposed by the steering control law in various momentum directions relative to a reference point 302 for the CMG array momentum, wherein the reference point 302 corresponds to a CMG array momentum equal to zero. It should be understood that FIG. 3 is a simplified representation of the momentum limits, and in practice, the surface 300 will be three-dimensional. Additionally, it should be noted that in alternative embodiments, the momentum boundary criteria may correspond to limits on the momentum of the CMG array which is imposed to ensure the CMG array can provide a certain amount of torque in certain directions or to satisfy some other performance criteria for a given application, and the momentum boundary is not intended to be limited to momentum limits imposed by a steering control law solely for purposes of preventing singularity and/or saturation.

Referring again to FIG. 2, in an exemplary embodiment, the control module 108 determines whether the total angular momentum of the CMG array violates or is approaching a momentum boundary in the momentum direction. When the total angular momentum of the CMG array is not violating or approaching the momentum boundary in the momentum direction, the momentum control process 200 continues by determining CMG array commands based on the input torque command and the steering control laws and operating the CMG array, as described in greater detail below (tasks 212).

In an exemplary embodiment, when the total angular momentum of the CMG array violates or is approaching a momentum boundary in the momentum direction, the momentum control process 200 continues by determining a modified torque command by decreasing the input torque command in the direction of the kinetic momentum of the CMG array (alternatively, the kinetic momentum direction) (task 208). The amount by which the input torque command is decreased is preferably chosen such that the rate of increase of the kinetic angular momentum in the kinetic momentum direction will be slowed to prevent and/or correct violations of the momentum boundary. As a result, the total angular momentum of the CMG array 110 is allowed to gradually increase until the total angular momentum meets the momentum boundary in the momentum direction (i.e., when total angular momentum is substantially equal to the momentum boundary). Thus, the modified torque command maintains the total angular momentum of the CMG array 110 within the momentum boundary provided by the steering control laws. The total angular momentum of the CMG array 110 may remain substantially equal to the momentum boundary in the momentum direction until a torque command is received that reduces total angular momentum, as will be appreciated in the art.

Figure 4:
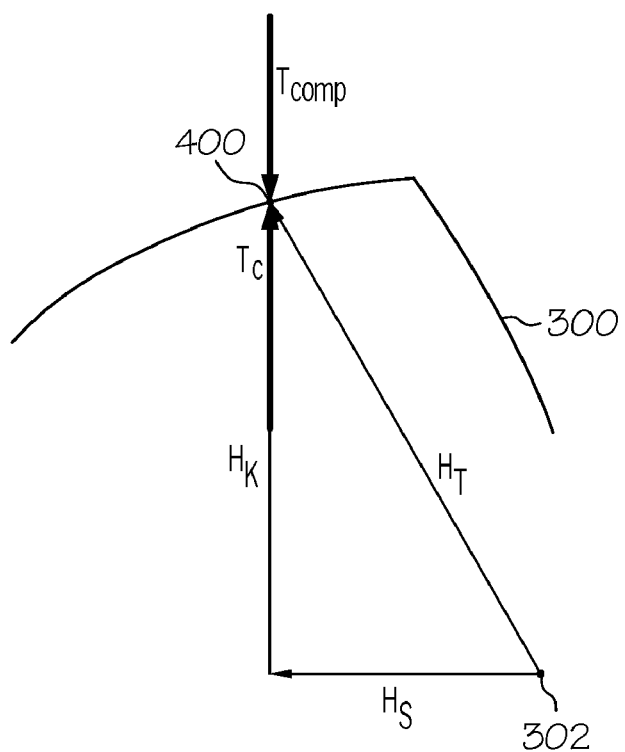

Referring now to FIGS. 2-4, and with continued reference to FIG. 1, in an exemplary embodiment, the control module 108 obtains the total angular momentum of the CMG array 110 ($H_T$) and determines whether the total angular momentum of the CMG array 110 violates or is approaching a momentum boundary in the momentum direction (tasks 204, 206). As shown in FIG. 3, when the total momentum of the CMG array 110 does not violate the momentum boundary 300, the control module 108 operates the CMG array 110 based on the torque command ($T_C$). The torque command illustrated in FIG. 3 causes the kinetic momentum ($H_K$) of the CMG array 110 increase in a corresponding manner (tasks 210, 212). As shown in FIG. 4, when the total angular momentum ($H_T$) approaches the momentum boundary in the momentum direction (represented by point 400 on the momentum boundary surface 300), the control module 108 decreases the torque command in the kinetic momentum direction (or alternatively, increases the torque command in the direction opposite the kinetic momentum direction) (tasks 206, 208).

In an exemplary embodiment, the momentum control process 200 decreases the torque command ($T_C$) in the kinetic momentum direction by subtracting a projection of the input torque command onto a unit vector in the kinetic momentum direction $$\left(\frac{H_K}{\|H_K\|}\right)$$

from the input torque command, thereby reducing the component of the torque command ($T_C$) in the kinetic momentum direction. In this regard, the momentum control process 200 may determine or otherwise calculate a compensation vector ($T_{COMP}$) comprising the projection of the input torque command ($T_C$) onto the unit vector in the direction opposite the kinetic momentum direction, such that the vector sum of the torque command and the compensation vector results in a modified torque command ($T^*_C = T_C + T_{COMP}$) corresponding to subtracting the projection of the input torque command onto the unit vector in the kinetic momentum direction. The compensation vector ($T_{COMP}$) may be determined or calculated as the dot product of the input torque command ($T_C$) with the unit vector in the direction opposite the kinetic momentum direction, such that the compensation vector ($T_{COMP}$) is equal to $$\left(T_C \cdot -\frac{H_K}{\|H_K\|}\right)\left(\frac{H_K}{\|H_K\|}\right),$$

wherein $T_C$ is the input torque command vector and $H_K$ is the kinetic momentum vector corresponding to the kinetic momentum of the CMG array 110 in the kinetic momentum direction.

In an exemplary embodiment, if the total momentum of the CMG array 110 violates the momentum boundary in the momentum direction, the torque command may be further decreased in the kinetic momentum direction (or increased in the direction opposite the kinetic momentum direction) by subtracting a vector in the kinetic momentum direction having a magnitude equal to a gain factor multiplied by a difference between the angular momentum of the CMG array and the momentum boundary (i.e., the amount by which the total angular momentum has violated the momentum boundary in the momentum direction). In accordance with one embodiment, the control module 108 determines the vector difference between the total angular momentum of the CMG array 110 and the limit on momentum in the momentum direction and projects the difference onto the unit vector in the kinetic momentum direction to obtain the amount by which the total angular momentum has violated the momentum boundary. This is multiplied by a gain factor and the unit vector in the direction of kinetic momentum, resulting in a vector equal to $$g\left[(H_T - M) \cdot \left(\frac{H_K}{\|H_K\|}\right)\right]\left(\frac{H_K}{\|H_K\|}\right),$$

where $H_T$ is the total angular momentum vector for the CMG array 110, M is the vector corresponding to the momentum boundary imposed by the steering control laws in the direction of the total angular momentum vector (e.g., the vector from the reference point 302 to the point 400 on the momentum boundary surface 300 corresponding to the limit on momentum imposed by the momentum boundary in the momentum direction), and g is a scalar value corresponding to the gain factor. This resulting vector may be added to the projection of the input torque command ($T_C$) onto the unit vector in the direction opposite the kinetic momentum direction, resulting in a compensation vector ($T_{COMP}$) equal to $$\left\{T_C \cdot \left(-\frac{H_K}{\|H_K\|}\right) + g\left[(H_T - M) \cdot \left(-\frac{H_K}{\|H_K\|}\right)\right]\right\}\frac{H_K}{\|H_K\|},$$

which is in the direction opposite the kinetic momentum direction. Thus, the vector sum of the compensation vector and the input torque command results in the modified torque command which causes a decrease or reduction of the total angular momentum of the CMG array 110 in the kinetic momentum direction.

In an exemplary embodiment, the momentum control process 200 continues by determining commands for the CMGs of the CMG array (alternatively referred to herein as CMG array commands) based on the torque command and the steering control laws and operating the CMGs of the CMG array using the CMG array commands (tasks 210, 212). When the total angular momentum does not violate or approach the momentum boundary, the control module 108 determines gimbal rate commands (e.g., commanded rates of rotation of the gimbals for the individual CMGs of the CMG array 110) for the CMG array 110 by applying the steering control laws to the input torque command ($T_C$) in a conventional manner. In this regard, as shown in FIGS. 3-4, the gimbal rate commands result in the CMGs of the CMG array 110 being rotated in a manner that produces the commanded torque and increases the kinetic momentum ($H_K$) in the direction of the input torque command ($T_C$) until the total angular momentum reaches the momentum boundary. When the total angular momentum violates or approaches the momentum boundary, the control module 108 determines gimbal rate commands for each CMG of the CMG array based on the modified torque command ($T^*_C$) by applying the steering control laws to the modified torque command. In this regard, as shown in FIG. 4, when the torque command ($T_C$) is aligned with and/or parallel to the kinetic momentum ($H_K$), the compensation vector effectively cancels out the torque command, such that the modified torque command is equal to zero, resulting in gimbal rate commands of zero, thereby maintaining constant total angular momentum ($H_T$) of the CMG array 110. The loop defined by tasks 202, 204, 206, 208, 210 and 212 may repeat as desired to enable continuously and dynamically repositioning the vehicle throughout operation.

Figure 5:
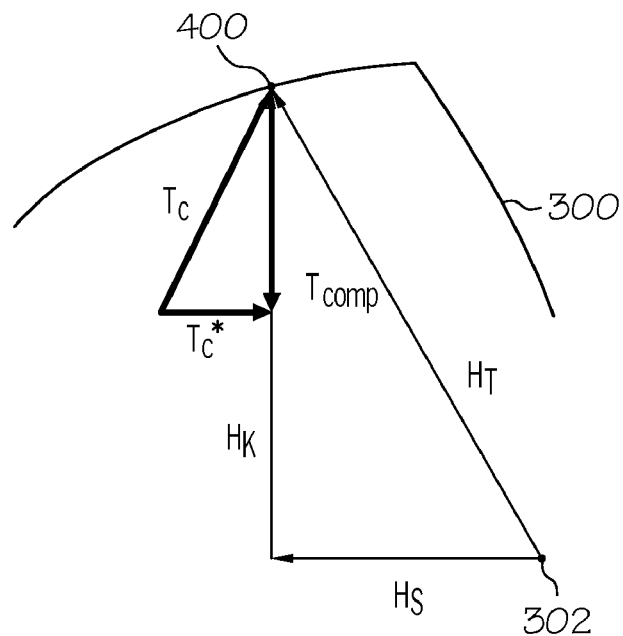
Figure 6:
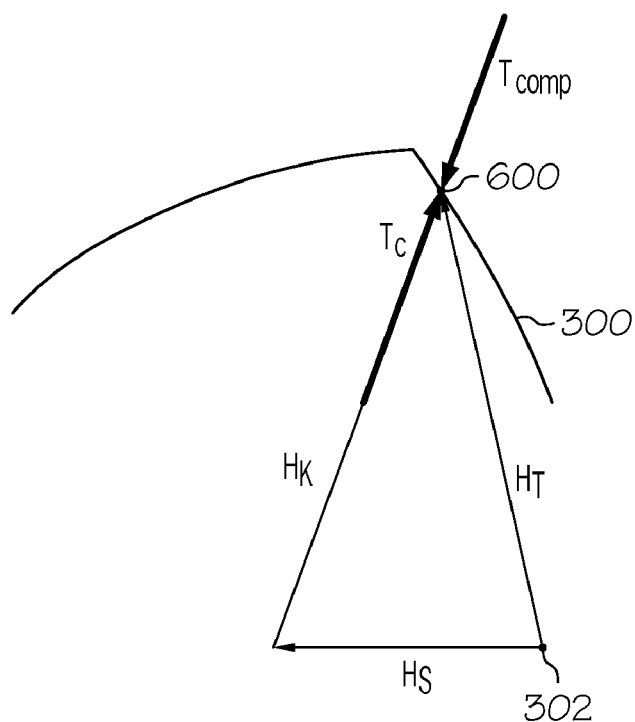

Referring now to FIGS. 5 and 6, when the input torque command ($T_C$) is not aligned with and/or parallel to the kinetic momentum ($H_K$), decreasing the input torque command in the kinetic momentum direction results in a modified torque command ($T^*_C$) that allows the total angular momentum of the CMG array 110 to be adjusted along the momentum boundary. As shown in FIG. 6, the total angular momentum ($H_T$) of the CMG array 110 will effectively slide along the momentum boundary surface 300 until reaching a momentum state (indicated by point 600) where the kinetic momentum ($H_K$) is aligned with and/or parallel to input torque command ($T_C$). Thus, the momentum control process 200 described herein is capable of providing torque and allowing cross-axis control of the CMG array 110 and/or agile vehicle 114 when the momentum boundary is reached.

To briefly summarize, the methods and systems described above allow for a CMG array to store and/or transfer the maximum amount of momentum allowable under the steering control laws used to operate the CMG array. This, in turn, allows the ACS to maximize the momentum capabilities of the CMG array to quickly reorient or otherwise adjust the attitude of an agile vehicle. The input torque command is decreased in the direction of the CMG array kinetic momentum, resulting in a modified torque command that allows the ACS to maintain cross-axis control of the agile vehicle while safely avoiding conditions that may lead to singularity and/or saturation of the CMG array or other undesirable performance reductions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for reorienting a vehicle using a control moment gyroscope (CMG) array comprising a plurality of CMGs onboard the vehicle, the CMG array having a total angular momentum including a kinetic angular momentum component in a kinetic momentum direction, the method comprising:
   obtaining an input torque command for reorienting the vehicle using the CMG array; and
   when the total angular momentum violates or is approaching a momentum boundary criterion:
   decreasing the input torque command in the kinetic momentum direction, resulting in a modified torque command; and
   operating the CMG array using the modified torque command.

2. The method of claim 1, further comprising:
   obtaining a total momentum vector for the CMG array, the total momentum vector corresponding to the total angular momentum in a momentum direction, wherein the momentum boundary criterion comprises a momentum boundary in the momentum direction; and
   determining whether the total angular momentum violates or is approaching the momentum boundary in the momentum direction.

3. The method of claim 2, wherein obtaining the total momentum vector comprises determining the total momentum vector based on gimbal angles for the respective CMGs of the plurality of CMGs, the total momentum vector corresponding to the total angular momentum in the momentum direction.

4. The method of claim 2, further comprising:
   obtaining a stored momentum vector corresponding to stored angular momentum of the CMG array in a stored momentum direction; and
   determining a kinetic momentum vector based on the total momentum vector and the stored momentum vector, the kinetic momentum vector corresponding to the kinetic angular momentum in the kinetic momentum direction.

5. The method of claim 2, the momentum boundary being based on a steering control law for operating the CMG array, wherein operating the CMG array comprises:
   applying the steering control law to the modified torque command to obtain rate commands for gimbals of the plurality of CMGs; and
   rotating the gimbals in accordance with the rate commands.

6. The method of claim 2, wherein decreasing the input torque command in the kinetic momentum direction comprises subtracting a projection of the input torque command onto a unit vector in the kinetic momentum direction from the input torque command.

7. The method of claim 6, wherein the modified torque command is equal to $$\left[T_C \cdot \left(-\frac{H_K}{\|H_K\|}\right)\right] \frac{H_K}{\|H_K\|},$$

wherein:
   $T_C$ is a vector corresponding to the input torque command; and
   $H_K$ is a vector corresponding to the kinetic angular momentum, such that $$\frac{H_K}{\|H_K\|}$$

is equal to the unit vector in the kinetic momentum direction.

8. The method of claim 7, wherein when the total angular momentum violates the momentum boundary, decreasing the input torque command in the kinetic momentum direction further comprises subtracting a vector in the kinetic momentum direction having a magnitude equal to a gain factor multiplied by an amount that the total angular momentum exceeds the momentum boundary in the momentum direction.

9. The method of claim 8, wherein the modified torque command is equal to $$\left\{T_C \cdot \left(-\frac{H_K}{\|H_K\|}\right) + g\left[(H_T - M) \cdot \left(-\frac{H_K}{\|H_K\|}\right)\right]\right\} \frac{H_K}{\|H_K\|},$$

wherein:
   $T_C$ is a vector corresponding to the input torque command;
   $H_K$ is a vector corresponding to the kinetic angular momentum, such that $$\frac{H_K}{\|H_K\|}$$

is equal to the unit vector in the kinetic momentum direction;
   $H_T$ is a vector corresponding to the total angular momentum of the CMG array in the momentum direction;
   M is a vector corresponding to the momentum boundary in the momentum direction; and
   g is a scalar corresponding to the gain factor.

10. A method for controlling attitude of an agile vehicle using a plurality of gyroscopes onboard the agile vehicle, the method comprising:
    receiving an input torque command vector for adjusting attitude of the agile vehicle;
    obtaining a total momentum vector corresponding to total angular momentum of the plurality of gyroscopes in a momentum direction, the total momentum vector including a kinetic momentum component in a kinetic momentum direction;
    determining whether the total angular momentum of the plurality of gyroscopes exceeds or is likely to exceed a limit on momentum in the momentum direction imposed by a steering control law for operating the plurality of gyroscopes prior to stopping rotation of the plurality of gyroscopes;
    reducing a component of the input torque command vector in the kinetic momentum direction, resulting in a modified torque command vector; and
    operating the plurality of gyroscopes based on the modified torque command vector and the steering control law.

11. The method of claim 10, wherein operating the plurality of gyroscopes comprises determining rate commands for each gyroscope of the plurality of gyroscopes by applying the steering control law to the modified torque command vector, wherein the plurality of gyroscopes are commanded using the rate commands to control the attitude of the agile vehicle.

12. The method of claim 10, wherein reducing the component of the input torque command vector in the kinetic momentum direction comprises:
   determining a compensation vector; and
   adding the compensation vector to the input torque command vector to obtain the modified torque command vector.

13. The method of claim 12, wherein determining the compensation vector comprises projecting the input torque command vector onto a unit vector in a direction opposite the kinetic momentum direction.

14. The method of claim 13, wherein the compensation vector is equal to $$\left[T_C \cdot \left(-\frac{H_K}{\|H_K\|}\right)\right] \frac{H_K}{\|H_K\|},$$

wherein:
   $T_C$ is the input torque command vector; and
   $H_K$ is a vector corresponding to the kinetic momentum component of the total momentum vector in the kinetic momentum direction.

15. The method of claim 13, wherein determining the compensation vector further comprises:
   determining a difference vector between the total angular momentum and the limit on momentum in the momentum direction;
   multiplying a projection of the difference vector onto the unit vector in the kinetic momentum direction by a gain factor and the unit vector in the direction opposite the kinetic momentum direction, resulting in a first vector; and
   adding the first vector and a projection of the input torque command vector onto the unit vector in the direction opposite the kinetic momentum direction.

16. The method of claim 15, wherein the compensation vector is equal to:

$$\left\{T_C \cdot \left(-\frac{H_K}{\|H_K\|}\right) + g\left[(H_T - M) \cdot \left(-\frac{H_K}{\|H_K\|}\right)\right]\right\} \frac{H_K}{\|H_K\|},$$

wherein:
   $T_C$ is the input torque command vector;
   $H_K$ is a vector corresponding to the kinetic momentum component of the total momentum vector in the kinetic momentum direction;
   $H_T$ is the total momentum vector;
   M is a vector corresponding to the limit on momentum in the momentum direction; and
   g is a scalar corresponding to the gain factor.

17. A control system for an agile vehicle, the control system comprising:
   an attitude control system (ACS) configured to provide a torque command for reorienting the agile vehicle; and
   a momentum control system (MCS) coupled to the ACS, the MCS comprising a control moment gyroscope (CMG) array comprising a plurality of CMGs onboard the agile vehicle, wherein the MCS is configured to:
      obtain the torque command from the ACS;
      identify when angular momentum of the CMG array violates or is approaching a momentum boundary criterion; and
      when the angular momentum of the CMG array violates or is approaching the momentum boundary criterion:
         determine a modified torque command by decreasing the torque command in a direction of kinetic angular momentum of the CMG array; and
         operating the CMG array using the modified torque command.

18. The control system of claim 17, wherein the modified torque command is equal to $$\left[T_C \cdot \left(-\frac{H_K}{\|H_K\|}\right)\right] \frac{H_K}{\|H_K\|},$$

wherein:
   $T_C$ is a vector corresponding to the torque command from the ACS; and
   $H_K$ is a vector corresponding to the kinetic angular momentum of the CMG array, such that $$\frac{H_K}{\|H_K\|}$$

corresponds to a unit vector in the direction of the kinetic angular momentum.

19. The control system of claim 17, the angular momentum of the CMG array being in a momentum direction, wherein the MCS comprises a control module coupled to the CMG array, wherein the control module is configured to:
   determine whether the angular momentum of the CMG array violates or is approaching a momentum boundary in the momentum direction, the momentum boundary being based on a steering control law for operating the CMG array; and
   apply the steering control law to the modified torque command to obtain gimbal rate commands for the plurality of CMGs when the angular momentum of the CMG array violates or is approaching the momentum boundary, wherein the plurality of CMGs are operated in accordance with the gimbal rate commands.

20. The method of claim 1, wherein the kinetic angular momentum component is equal to angular momentum of the vehicle and the kinetic angular momentum direction is opposite the angular momentum of the vehicle.

21. A method for reorienting a vehicle using a control moment gyroscope (CMG) array onboard the vehicle, the CMG array having a total angular momentum including a kinetic angular momentum component in a kinetic momentum direction, the method comprising:
   obtaining an input torque command for reorienting the vehicle using the CMG array; and
   when the total angular momentum violates or is approaching a momentum boundary criterion:
      subtracting a projection of the input torque command onto a unit vector in the kinetic momentum direction from the input torque command to obtain a modified torque command; and
      operating the CMG array using the modified torque command.

* * * * *